April 7, 1936.                E. A. MENHALL                2,036,344
                    FREIGHT CAR FOR TRANSPORTING VEHICLES
                        Filed Dec. 2, 1932         4 Sheets-Sheet 1
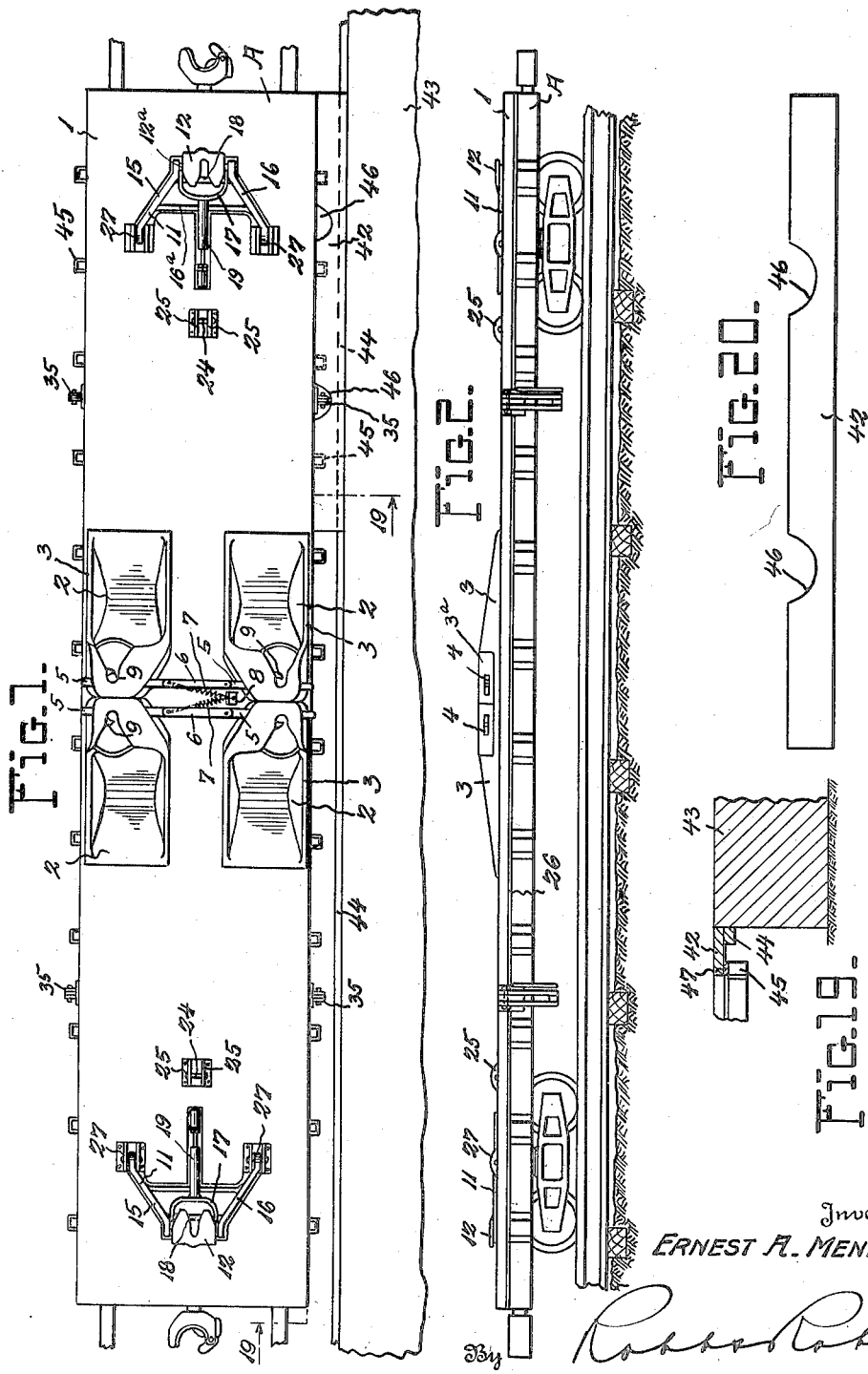
Inventor
ERNEST A. MENHALL
By
Attorneys April 7, 1936.  E. A. MENHALL  2,036,344
FREIGHT CAR FOR TRANSPORTING VEHICLES
Filed Dec. 2, 1932  4 Sheets-Sheet 2
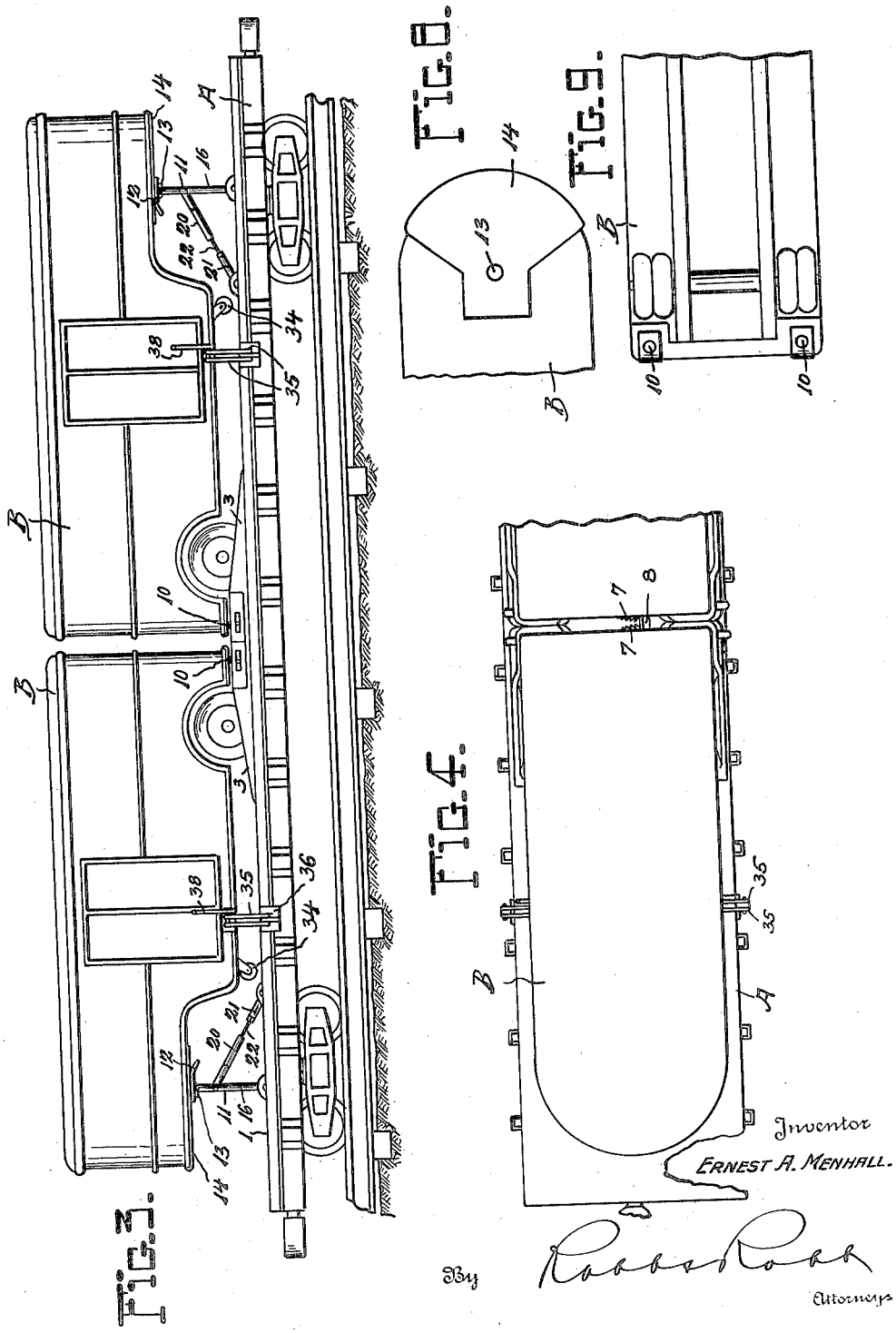

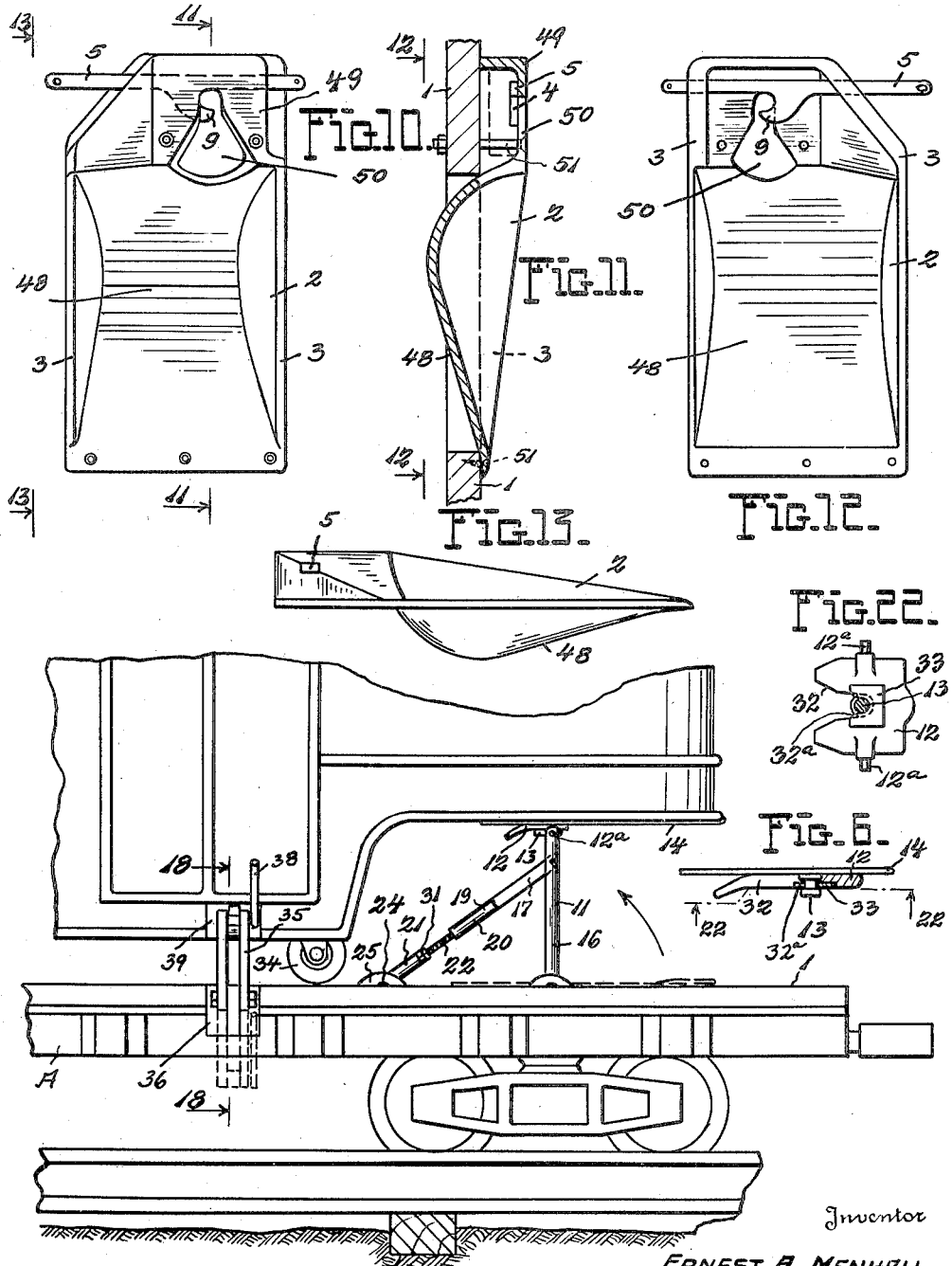

April 7, 1936.  E. A. MENHALL  2,036,344
FREIGHT CAR FOR TRANSPORTING VEHICLES
Filed Dec. 2, 1932  4 Sheets-Sheet 4
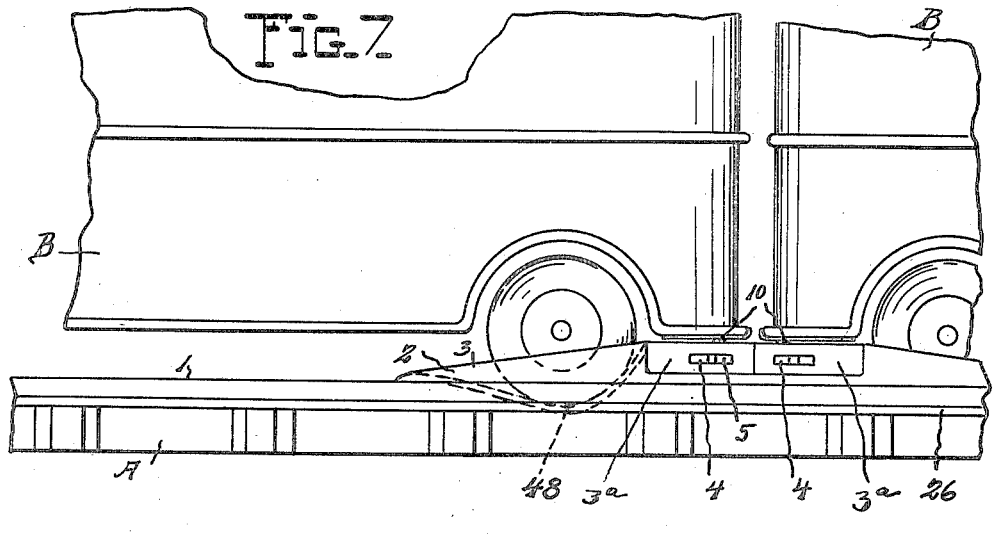
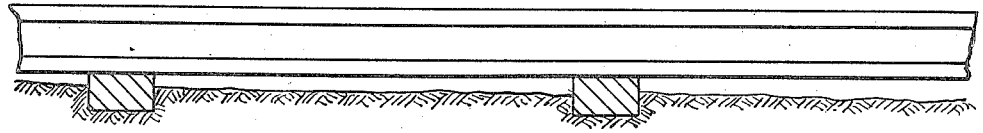
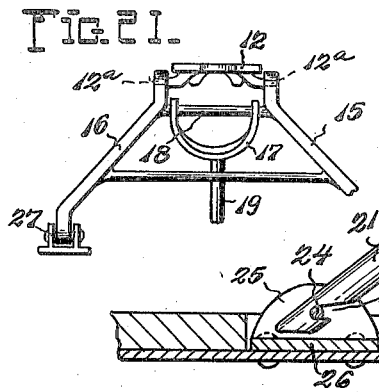
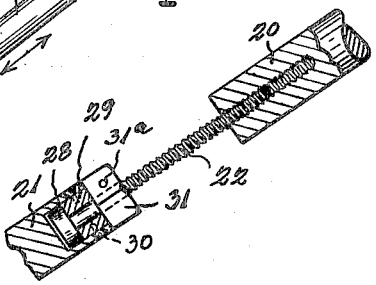
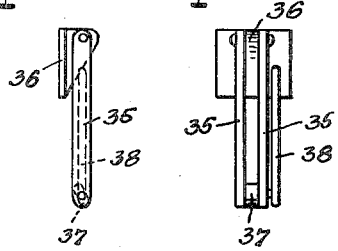
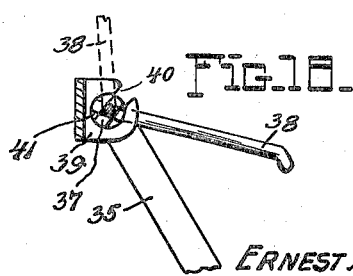
Inventor
ERNEST A. MENHALL.
By Robert Robb
Attorneys Patented Apr. 7, 1936

2,036,344

UNITED STATES PATENT OFFICE 2,036,344

FREIGHT CAR FOR TRANSPORTING VEHICLES

Ernest A. Menhall, Edgerton, Wis., assignor to Highway Trailer Company, Edgerton, Wis., a corporation Application December 2, 1932, Serial No. 645,462

22 Claims. (Cl. 105—368)

As is well known, in the automotive vehicle art there are very largely employed various types of tractor-trailer combination units, which are composed of a tractor vehicle which furnishes the motive power of the combination, and a trailer vehicle, which carries the pay-load, coupled to the tractor vehicle.

The present invention deals with the problem of transporting trailer vehicles on freight cars from the factory to point of delivery, the invention embracing a novel construction of a car which enables the trailer to be rigidly mounted on the car and interlocked thereto.

The invention further contemplates the provision of means enabling the vehicle to be run from a ramp or loading platform adjacent the railroad tracks directly onto the car without requiring the trailer to be lifted from the platform onto the car, and also, the said means enables the trailer to be removed from the car directly. Therefore, the car can be used to transport loaded trailers from point to point for delivery of the load therein, as well as for transportation of the trailers from the factory.

The locking instrumentalities included in the construction of the car comprise locking means for locking the trailer to the car at both ends of the trailer, and include instrumentalities whereby the trailer will not only be securely locked but will be rigidly supported against excessive vibration in transit and securely held against displacement. To enable the trailer to be locked in position, it is provided with means adapted to interengage with the locking instrumentalities on the car.

The construction of the car is such that depressions or wells for receiving the wheels of the trailer are provided, there being suitably positioned adjacent these wells releasable locking instrumentalities for automatically locking with suitable locking pins or equivalent devices provided on the frame of the trailer. These locking devices are constructed so that they will firmly engage the aforesaid locking pins of the trailer and firmly hold the same against displacement, while at the same time being constructed so that they will be readily released when the trailer is to be dismounted from the car.

The locking means for the front end of the trailer includes a mechanism for interlocking with the trailer, conveniently with the king pin of the trailer fifth wheel, which is of standard construction. The locking instrumentalities are retained by a brace which is adjustable as to length, so as to vary the vertical angle of the locking devices. The adjustment is such that after engagement with the trailer, the length of the bracing devices may be adjusted, so as to lift the front end of the trailer off from the floor of the car, and rigidly hold the trailer against both longitudinal and lateral displacement, it being understood that the trailer interlocks with the locking devices as the trailer is lifted.

To assure against lateral displacement of the trailer, the locking means mentioned heretofore are supplemented by locking instrumentalities mounted on each side of the car and adapted to interlock with the trailer on both sides thereof.

All of these locking devices are very simple in construction and readily and quickly releasable so that the trailer may be easily run off the car at the point of delivery.

Where a king pin type of trailer is employed, the forward locking member of the car resembles in general the construction of a lower fifth wheel insofar as concerns its king pin engaging and locking functions. This forward locking member is hingedly mounted and when not in use is folded in suitable depressions in the floor of the car so that when folded and inoperative the locking mechanism is substantially flush with the car floor. Also, the locking members on the side of the car, above referred to, may be operated so as to be positioned out of the way when not in use.

The car construction represented by this invention constitutes a substantial advance in transportation instrumentalities for vehicles, since the vehicles are transported without danger of displacement, are readily rolled directly onto and off the car for loading and unloading, and the instrumentalities are so disposed that at least two vehicles may be thus mounted on a car of standard length.

The details of the various constructions above indicated will be set forth completely in the following description and will be readily understood by reference to the accompanying drawings, in which—

Figure 1 is a top plan view of a car constructed to include the novel features of this invention.

Figure 2 is a side elevation of the car.

Figure 3 is a side elevation of the car, as in Figure 2, but showing a pair of trailers mounted on the car and interlocked therewith ready for transportation.

Figure 4 is a top plan view of a fragment of the car and trailer illustrated in Figure 3.

Figure 5 is a fragmentary side view of one of the trailers, showing the front end and side locking devices for the trailer, together with the manner in which these locking devices are moved when in operative and inoperative positions.

Figure 6 is a fragmentary view partially in section, of the locking devices for the front end of the trailer, showing the devices interlocking with the trailer king pin.

Figure 7 is a fragmentary side view showing how the trailers are mounted on the car with the rear wheels thereof in the wheel receiving wells formed in the car.

Figure 8 is a fragmentary bottom view of the upper fifth wheel and king pin of one of the trailers.

Figure 9 is a fragmentary bottom view of the rear of one of the trailers, showing the locking pins mounted thereon for engaging with the locking instrumentalities associated with the wheel receiving wells.

Figure 10 is a plan view of one of the wheel receiving members, showing the bottom contour thereof.

Figure 11 is a sectional view on the line 11—11 of Figure 10.

Figure 12 is a bottom view of the device taken on the line 12—12 of Figure 11.

Figure 13 is a side view of the member taken on the line 13—13 of Figure 10.

Figure 14 is a fragmentary sectional view showing the manner of securing one of the supports for the front locking device in operative position.

Figure 15 is a fragmentary sectional view showing the instrumentalities for adjusting the length of the support.

Figure 16 is a side view of one of the lateral side locking devices in inoperative position.

Figure 17 is a front view of the device of Figure 16.

Figure 18 is a fragmentary view showing the manner in which the locking device of Figures 16 and 17 operates.

Figure 19 is a fragmentary sectional view showing a bridge member employed in connection with the car and loading platform, whereby the vehicle is enabled to be rolled directly onto and off from the car, the view being taken on the line 19 of Figure 1, looking in the direction of the arrows.

Figure 20 is a side elevation of the bridge member of Figure 19.

Figure 21 is a detailed front elevation of the pivoted supporting bracket.

Figure 22 is a section on the plane of line 22—22 of Fig. 6, parts being seen in inverted plan.

Referring more particularly to the drawings, A represents a car which is preferably a flat car of standard length and embracing the novel features of this invention, which enable the trailers B to be speedily mounted thereon and interlocked therewith for transportation.

In order to satisfactorily transport the vehicles, it is obvious that they must be firmly secured and supported so that they will be rigidly mounted and unaffected by jolts or jars experienced in transit. To this end, as has been already indicated, locking instrumentalities are provided for interlocking the trailer, at both ends, to the car.

In proceeding with this description, the locking instrumentalities for the rear end of each vehicle will be described first.

It will be clear from the drawings that two trailers may be mounted on the car and similarly interlocked; and for receiving each pair of rear wheels, the floor 1 of the car is cut away so as to receive the wheel receiving members, inserts, or wells 2. These members are generally cupped, or dished, metal inserts of the shape shown in the drawings, which inserts are positioned in the recesses in the car floor with their forward edges flush with the floor of the car so that the passage of the wheels into the inserts will not be obstructed. These inserts are provided with upstanding lateral flanges 3, in which are positioned the housings 3a for the locking devices about to be described. Each of these housings constitutes a plate cut away at 4 for the reception of the ends of the locking devices.

These locking devices comprise a plurality of pivotally interconnected links, the outermost ones being indicated at 5, with an intermediate link 6. The links 6 of the locking devices may be interconnected at one end by tension springs 7 to a common bracket 8 secured to the floor of the car.

Each link 5 is provided with a locking member 9, which, in the form shown in the drawings, may be simply a hook having a curved or camming surface extended in the direction of the longitudinal axis of the car, as shown in the drawings. A set of links made up of an intermediate link 6 and two links 5, one at each end of link 6, is provided for each pair of wells 2, so that one hook 9 extends in position to interlock with each pin 10 depending from the respective trailer and rigidly connected therewith so as to cause a camming action where approaching and contacting with the curved exposed surfaces of hooks 9. Longitudinal movement of a set of links 5 and 6 transversely of car A in one direction will cause hooks 9 to move out of the path of pins 10 to allow the pins to move either into or out of the interlocked relation with the hooks 9. Since the wells 2 for both trailers are preferably juxtaposed on car A, the two sets of links 5 and 6 may be said to comprise a pair of fastening devices. While each set of links may be independently spring stressed toward and to the locking position, a convenient arrangement includes employment of the pair of springs 7 tensioned to seat the hooks 9 in locking engagement with pins 10. When loading the trailer, the locking pins 10, which are properly spaced and located on the trailer, contact the hooks 9 and cam them laterally against the tension of springs 7 to enable passage of the locking pins, and then, after passage of the pins, the hooks 9 snap back into locking engagement therewith.

Each of the wells 2 comprises the cupped or dished body portion 48, see Figs. 10 to 13, inclusive, from which extends a projection, or flange, 49, in which is formed the opening 50. This opening has converging sides, and terminates behind the locking hook 9, so that when the pins 10 enter these openings, they will be guided by the converging sides so as to properly engage the locking hooks 9 to interlock therewith while positioning the rear wheels of the trailer in the wells 2 so as to align the wheels, and, consequently, the trailer, so that it will be automatically positioned for locking at its front end, as will be described hereinafter. The inserts forming the wells 2 are firmly secured to the floor of the car and are effectively anchored in place against displacement under lateral shock or other stress, as by bolts or rivets 51, 51 connecting the wells to the car floor 1.

The instrumentalities above described will automatically properly position the trailer and automatically and rigidly lock the rear thereof incident to backing of the trailer wheels into the members 2, and the front end of the trailer is now ready to be locked. The mechanism for accomplishing this comprises certain cooperating instrumentalities which are mounted to engage and interlock with the usual king pin of the trailer.

These instrumentalities include a pivoted bracket or support 11 hinged on bracket-plates countersunk in the floor of the car, the hinged connection enabling the support to be swung vertically into operative and inoperative positions. Bracket 11 comprises essentially a framework, formed of the converging arms 15 and 16, and cross connecting bars 16a and 18, Fig. 1. Each of arms 15 and 16 is pivoted at its lower end on a bracket 27. A locking and contact or buffer plate 12 is pivoted to and across the free end of the bracket 11, as by trunnions 12a outstanding laterally from plate 12 and finding bearing in the free ends of arms 15 and 16.

Details of plate 12 are shown in Figures 6, 21, and 22 from which figures it will be seen that the plate 12 preferably has the general configuration of the usual plate of the lower fifth wheel serving as the coupling instrumentalities customarily employed on tractor vehicles for interlocking with the trailer king pin for coupling together the tractor and trailer vehicles. Accordingly, the plate 12 includes the guide extensions 32, Figs. 6 and 22, between which is located the notch or open slot for receiving the king pin 13 mounted on the usual trailer fifth wheel member 14. The closed end portion of the slot provides the center opening 32a to accommodate the king pin when the latter is in its final, interlocked engagement with plate 12. As a means of increasing the snugness of the interlock, a plate 33, welded or otherwise fixed to plate 12, relatively snugly engages the reduced neck portion of king pin 13, the plate 33 being notched or slotted similarly to the notch or open slot of plate 12, except that the latter is proportioned to accommodate the maximum diameter of the king pin while the notch or slot of plate 33 is proportioned to snugly receive and engage the reduced or neck portion of the king pin.

Pivoted to the bracket or support 11 is a yoke 17. Yoke 17 preferably engages shaft 18, which forms part of bracket 11, whereby the yoke 17 may be freely swung vertically relative to the bracket.

To this yoke 17 is fastened an adjustable brace 19, comprising upper and lower sections 20 and 21, respectively, interconnected by an appropriate turn-buckle or the like, as best seen in Figures 14 and 15, and preferably of special construction including a screw 22. The lower section 21 preferably terminates in a hook as by being provided with a notch 23 adapted to engage a pin 24 which extends between the plates 25 of a bracket 26 countersunk in the floor 1 of the car. Engagement between the hook and pin 24 secures the brace 19 in its operative position, while enabling ready disengagement to allow the brace to be swung to a folded position relative to bracket 11.

The screw 22 has its head 28 appropriately swiveled to one of the members 20 and 21 while the screw itself is threaded into the other. The swiveled connection of the screw head may include the countersinking of the head in a recess provided within the end of the section 21, in which case the shank of the screw is threaded in the upper section 22. Of course this relation may be reversed. Head 28 is retained against axial movement by a collar 29, also located within the recessed end of the section 21, the collar being fastened to section 21 by screws 30, or equivalent fastening devices, which immovably fix the collar and prevent displacement of the screw head during operation. A nut 31 is fixed to the shank 22 of the screw, as by locking pin 31a, and serves as a tool receiver and enables rotation of the screw while being held against relative longitudinal movement with respect to section 21. This rotation of the nut and screw brings together or separates the sections 20 and 21, depending on the direction of rotation, and proportionally the effective length of the brace 19.

It will be seen, therefore, that brace 19, the arms 15 and 16, yoke 17, and plate 12 form a unit, the parts of which closely cooperate. When these parts are collapsed, they lie substantially flush with the surface of the car floor, as seen in Figure 2, being countersunk in suitable recesses or grooves provided therefor, so as not to obstruct the manipulation of the trailer onto the car.

Now, when the trailer has been run onto the car, and the rear end interlocked as previously described, the king pin of the trailer will be in position to be engaged by the plate 12 and interlocked therewith.

The trailer is resting, of course, on its forward supporting wheels 34, and the length of bracket 11 is somewhat greater than the height of the bottom of the trailer above the car floor.

To interlock the forward end of the trailer, the bracket 11 is swung upward pivotally until the guides 32 of the plate 12 engage the king pin. Bracket 11 will then be still somewhat inclined from a vertical position. Brace 19 is then adjusted by separating the sections 20 and 21 thereof until notch or hook 23 interlocks with the pin 24 of bracket 26, as previously described. The screw 22 is then rotated to shorten the brace 19 and thus the plate 12 is drawn rearwardly into locking engagement with the king pin 13, wedging it way under the body of the trailer and in surface contact with fifth wheel 14. This movement swings the bracket 11 to an upright position, lifting the forward end of the trailer to accommodate the movement of the bracket, so that the locking of the plate 12 with the king pin is accompanied by relieving the front supporting wheels 34 of the load thereon.

The construction of the locking instrumentalities for the ends of the trailer have now been described, and the operation thereof will be clear from the description and drawings. Obviously, unlocking of these instrumentalities will be just the reverse of the locking operations above described.

In addition to these instrumentalities, however, means are provided for laterally locking the trailer to the car. For this purpose the car is provided, along each side, with brackets 36, each carrying a pair of parallel spaced links 35, 35, pivotally mounted on the bracket. The free ends of each pair of links are connected by a pin swiveled to the links and carrying a locking cam 37, the pins being fixed to an operating lever 38 adapted to be swung for moving the cam 37 to and from a locking position.

Each trailer is provided with an outstanding bracket 39 for each bracket 36 of its portion of car A. Each bracket 39 is located to properly register with the aforesaid links 35 and locking cam 37 when the trailer is locked with its rear wheels in wells 2. Each bracket 39 is slotted as at 40, to communicate with a recess 41 in the bracket. The lock cam 37 is adapted to pass edgewise through the slot 40 into the recess 41 when the links 35 are upward, and when so positioned may be turned by swinging lever 38 upward to the dotted line position in Fig. 18, and thereupon cam 37 will frictionally engage the surface of the recess 41 and lock therewith, thus overcoming any tendency of the trailer to be laterally displaced. When the surface of the recess 41 is made somewhat cam-shaped, instead of circular, manipulation of the lock bar will increase the pressure to be exerted on the bracket in inward and downward directions, thus securely pressing and gripping the trailer in position for holding it against lateral displacement. Arm 38 may be tied or otherwise fastened in its upright position to avoid accidental loosening, but the cam 37 will, when in locking position, usually tend to support arm 38 upright.

Part of the present invention is the provision of instrumentalities enabling the trailer to be run directly onto and off from the car. For this purpose bridge members are provided for bridging the gap between the car A and an adjacent loading platform. Such a bridge member is illustrated at 42 in Figs. 1 and 19, and is constructed to lie flush, when in position, with the floor of the loading platform 43 and the floor 1 of the car, respectively. The bridge member is removable when not in use.

For supporting the bridge members for service the loading platform is provided with a ledge 44, so that the bridge members may be laid upon this ledge and also upon the side brackets 45 of the car A. These brackets 45 are such as are usually employed on flat cars for holding load supporting bars for retaining a load on the car, and they are positioned sufficiently below the car floor to enable the bridge members to lie flush with the car floor 1, thus avoiding any substantial unevenness and providing a continuous surface from the loading platform to the car. To assure an unbroken surface, the bridge 42 may be provided with a longitudinal spacer 47, for levelling the bridge with the floor of the car. Portions of the bridge along a side thereof may be cut away, as indicated at 46, to receive the brackets 36, so that the bridge will fit closely against the side of the car.

Having thus described my invention, what I claim as new and desire to secure by Letters Patent of the United States, is—

1. A car construction of the character described, comprising the combination with a car body having recesses therein, of dished instrumentalities mounted in the said recesses in fixed relation thereto for receiving the wheels of a vehicle to be transported on the car, the upper extremities of said instrumentalities lying just slightly above the floor of the car, locking means carried by the said dished instrumentalities, and devices on the vehicle for engaging the locking means for locking the vehicle to the car body, said locking means and said devices being interengagable incident to movement of the vehicle on the car body.

2. A car construction of the character described, comprising the combination with a car body along which a wheeled vehicle to be transported thereon may be moved, of instrumentalities mounted on the car body for receiving the wheels of the vehicle to be transported on the car, locking means mounted in the said instrumentalities and comprising a retractable arm, a locking member on the arm adapted to yield under pressure of a lock engaging member on the vehicle, and means for securing the said lock member in locking position against the lock engaging member on the vehicle for locking the vehicle to the car body.

3. A car construction of the character described, comprising the combination with a car body, of instrumentalities mounted on the car body for receiving the wheels of a vehicle to be transported on the car, locking means associated with the said instrumentalities including a plurality of pivotally interconnected normally aligned arms, locking members on certain of the said arms yieldable under engagement of a lock engaging member on the vehicle, and resilient means interconnected with the said arms for drawing the lock members against the said lock engaging member for locking the vehicle to the car body.

4. A car construction of the character described, comprising the combination with a car body, of means for locking a vehicle to the car body, said vehicle having a coupling part, the means including a support hingedly interconnected with the car body for movement in a vertical plane, locking instrumentalities on the support and adapted to engage the vehicle adjacent the front end thereof, and means for hingedly moving said support as aforesaid to elevate the vehicle, said means also serving to bring said locking instrumentalities into locking interengagement with the coupling part of the vehicle as the vehicle is elevated.

5. A car construction of the character described, comprising the combination with a car body having a vehicle of conventional semi-trailer type mounted thereon, of instrumentalities mounted on the car body for receiving the rear wheels of the vehicle to be transported on the car, locking means associated with the said instrumentalities for locking the rear end of the vehicle to the car, and mechanism for engaging the front end of the vehicle for rigidly supporting the said front end, the said mechanism including means for engaging the usual king pin of the vehicle and interlocking therewith to support the front end of the vehicle and to restrain it from displacement.

6. A car construction of the character described, comprising the combination with a car body, of locking mechanism adapted to engage the usual king pin of a trailer vehicle mounted on the car body, the said mechanism comprising a locking member for engaging the king pin, and supporting means for the locking member, and a brace having means for adjusting the length thereof for locking the king pin to the locking member.

7. A car construction of the character described, comprising the combination with a car body, of locking mechanism adapted to engage the usual king pin of a trailer vehicle mounted on the car body, the said locking mechanism being a locking unit including a support, a locking member on the support, and a brace for the support, the said brace being formed of separate sections, adjustable means interconnecting the sections, and instrumentalities for adjusting the said means for varying the length thereof to enable the locking member and support to operatively engage the king pin, and means enabling the said unit to be collapsed into the car body.

8. A car construction of the character described, comprising the combination with a car body, of instrumentalities for locking a vehicle to the car body, the instrumentalities including a support hingedly mounted on the car, a locking device on the support adapted to interlock with the vehicle as the support is swung into operative position, the said support being somewhat longer than the normal distance between the car body and vehicle mounted thereon, whereby, upon actuation of the instrumentalities, the vehicle will be lifted by the support simultaneously with the locking of the locking device and vehicle.

9. A car construction of the character described, comprising the combination with a car body, of instrumentalities mounted on the body for engaging the usual king pin of a trailer vehicle to be transported on the car, the said instrumentalities including a locking member, adjustable supporting devices for the locking member serving to adjustably position the locking member at various elevations above the floor of the car body, and means hingedly mounting the supporting devices on the car body, the said car body being recessed to enable the said instrumentalities to lie substantially flush with the car floor when not in use.

10. A car construction of the character described, comprising the combination with a car body, of locking instrumentalities for supporting a vehicle on the said car body for transportation, and for locking the vehicle in position on the car body, the said instrumentalities including locking devices mounted on the sides of the car body and adapted to engage the sides of the vehicle mounted thereon, the said devices including arms pivotally interconnected to the car body, a lock bar turnably carried by the arms and adapted to engage brackets on the vehicle provided therefor, the said brackets being recessed to receive the locking bar, and an operative member for locking the said locking bar in the recess of the bracket.

11. A car construction of the character described, comprising the combination with a car body, of locking instrumentalities for supporting a vehicle on the said car body for transportation, and for locking the vehicle in position on the car body, the said instrumentalities including locking devices mounted on the sides of the car body and adapted to engage the sides of the vehicle mounted thereon, the said devices including arms pivotally interconnected to the car body when in inoperative position, a lock bar turnably carried by the arms and adapted to engage brackets on the vehicle provided therefor, the said brackets being recessed to receive the locking bar, and an operating lever for locking the said locking bar in the recess of the bracket, the said locking bar having a cam action in the said recess for more firmly securing the locking instrumentalities in locking position.

12. A car construction of the character described comprising the combination with a car body provided with apertures through the floor thereof, of dished inserts within the said apertures for receiving the wheels of a vehicle to be transported on the car, each of said inserts being provided with a lock forming a part thereof, and said locks including a reciprocable hook-shaped locking member adapted to receive a male coupling member on the transported vehicle when the wheels of the latter are received by the inserts.

13. A car construction of the character described, comprising a car body having a load receiving surface along which a vehicle to be transported thereon may be moved to transporting position, in combination with means for receiving the wheels of the vehicle to be transported, and for locking the vehicle to said car, which comprises a unit including a wheel receiving portion located in one zone, and a locking mechanism located in another zone and operable as the wheel receiving portion of the unit aforesaid receives a wheel of the vehicle.

14. In combination with a carrier vehicle for transporting wheeled vehicles from point to point, and a wheeled vehicle of the class described to be carried by said carrier vehicle, means for securing said wheeled vehicle to said carrier to prevent relative movement therebetween when in transit, but preserving the normal supporting function of certain of the wheels of the carried vehicle, said means comprising coupling pins mounted fore and aft on said road vehicle, locking devices for cooperation with said coupling pins mounted on said carrier vehicle and at least two of said coupling pins cooperating with said locking devices on the carrier and automatically locking therewith incident to movement of said wheeled vehicle on the carrier vehicle to a predetermined position on said carrier.

15. In combination with a railway car having a load receiving surface for transporting wheeled trailers from point to point, means for securing said trailer to said railway car to prevent relative movement therebetween when in transit, which comprises a pair of coupling pins located on the aft part of said trailer, locking instrumentalities associated with said car and adapted to engage and automatically lock with said coupling pins when said trailer is moved to a predetermined position on said car, and means for positioning the body of the said trailer on said car, comprising wheel receiving guides spaced laterally on the load receiving surface of said car.

16. A car construction for transporting wheeled vehicles, which comprises a load receiving platform having a pair of locking mechanisms disposed at each end thereof, said mechanisms being elevatable, and sets of wheel receiving means arranged in back to back relation and located between the first named locking mechanism and in the center of the load receiving part, said last named means each having locking mechanism associated therewith.

17. A unit for use in connection with cars for receiving and transporting vehicles and for securing the vehicle to be carried to the said car, which comprises a body portion having an arcuately recessed surface for the reception of the wheels of the vehicle to be transported, and a lock disposed immediately in the rear of said surface, said lock including a bolt member and resilient means for urging the bolt in one direction.

18. The method of anchoring a road vehicle having coupling instrumentalities thereon to a vehicle for wholly supporting and transporting the first vehicle, said second vehicle having coupling instrumentalities thereon for cooperation with the coupling instrumentalities of the first vehicle, which consists in loading the first vehicle on its transport, and when the first vehicle is wholly supported by the second locking the first named vehicle to the second by inter-engaging certain of the coupling instrumentalities of each vehicle through movement of the first named vehicle relative to the second vehicle while supported thereon, aligning certain others of the coupling instrumentalities during such movement, and subsequently interengaging said last mentioned coupling instrumentalities.

19. The method of securing a road vehicle having load wheels on the aft part thereof and supporting wheels on the fore part thereof, and a plurality of coupling devices thereon, to a second vehicle for bodily transporting the same, said second vehicle having coupling instrumentalities for cooperation with those of the first vehicle, which consists in loading the first named vehicle on the second, and when the first vehicle is wholly supported by the second moving the first named vehicle relative to the second named vehicle, guiding the road wheels of the second named vehicle to effect alignment of the coupling instrumentalities by movement of the first named vehicle to a predetermined position on the second vehicle, securing the same in a plurality of zones to the second named vehicle and thereafter elevating the fore part of the first named vehicle and securing the same to the second vehicle.

20. In a transportation system wherein wheeled road vehicles are loaded on a carrier vehicle and transported thereby, the carrier vehicle having a load receiving surface and the road or carried vehicle having the usual load supporting wheels at one end, temporary supports adjacent the other end, and draft coupling means adjacent said last mentioned end, means for securing said road vehicle to the carrier vehicle to prevent relative movement of the vehicles during transportation, comprising coupling means on the carrier vehicle complementary to the draft coupling means of the road vehicle for interlocking therewith and elevatable to raise the end of the road vehicle and relieve the temporary supports of load thereon.

21. In a transportation system wherein wheeled road vehicles are loaded on a carrier vehicle and transported thereby, the carrier vehicle having a load receiving surface and the road or carried vehicle having the usual load supporting wheels at one end, temporary supports adjacent the other end, and draft coupling means adjacent said last mentioned end, means for securing said road vehicle to the carrier vehicle to prevent relative movement of the vehicle during transportation, comprising coupling means on the carrier vehicle complementary to the draft coupling means of the road vehicle for interlocking therewith and elevatable to raise the end of the road vehicle and relieve the temporary supports of load thereon incident to coupling engagement of the coupling means aforesaid.

22. The combination with apparatus as defined in claim 20 of releasable means interconnecting the carried vehicle with the carrier vehicle in a zone remote from the draft coupling means, said releasable means including a pair of coupling pins rigidly mounted on the carried vehicle at opposite sides of the center of the vehicle, and extending downwardly therefrom towards the carrier vehicle, and latch means on the carrier vehicle adapted to interlockingly engage with the coupling pins.

ERNEST A. MENHALL.